United States Patent [19]

Wakamiya

[11] Patent Number: 5,031,726

[45] Date of Patent: Jul. 16, 1991

[54] MECHANISM FOR AUTOMATICALLY FIXING A SLIDE PLATE OF A SYSTEM FOR LIFTING A MOTOR VEHICLE FOR REPAIR THEREOF

[75] Inventor: Koji Wakamiya, Takahama, Japan

[73] Assignee: Sugiyasu Industries Co., Ltd., Takahama, Japan

[21] Appl. No.: 390,630

[22] Filed: Aug. 7, 1989

[30] Foreign Application Priority Data

Dec. 1, 1988 [JP] Japan ............................ 63-157068[U]

[51] Int. Cl.$^5$ ............................................ B60S 13/00

[52] U.S. Cl. .................................... 187/8.41; 187/77; 254/89 H

[58] Field of Search .................... 187/8.41, 8.43, 8.45, 187/8.75, 8.72, 8.67, 18, 8.47, 8.49, 8.5, 8.77; 254/2 R, 2 B, 122, 89 R, 89 H; 182/141; 108/143, 144, 148, 146, 54.1

[56] References Cited

U.S. PATENT DOCUMENTS

| | | | |
|---|---|---|---|
| 3,934,680 | 1/1976 | Bishop | 187/8.5 |
| 4,447,042 | 5/1984 | Masui | 187/8.43 |
| 4,638,886 | 1/1987 | Marietta | 187/8.49 |
| 4,658,933 | 4/1987 | Cheek et al. | 187/8.75 |
| 4,715,477 | 12/1987 | Suzuki | 187/8.75 |
| 4,825,977 | 5/1989 | Isogai | 187/8.75 |
| 4,921,074 | 5/1990 | Ochs | 187/18 |

FOREIGN PATENT DOCUMENTS

| | | | |
|---|---|---|---|
| 2618617 | 10/1977 | Fed. Rep. of Germany | 187/8.75 |
| 62-189391 | 12/1987 | Japan . | |
| 184948 | 4/1962 | Sweden | 187/8.41 |

*Primary Examiner*—Robert P. Olszewski
*Assistant Examiner*—Kenneth Noland
*Attorney, Agent, or Firm*—Lahive & Cockfield

[57] ABSTRACT

A mechanism for automatically fixing a slide plate mounted on a vehicle-body support plate of a lifting apparatus of a system for lifting a motor vehicle for repair thereof comprises a rack and a stopper which are capable of engaging each other to fix the slide plate to the first support plate, or vehicle-body support plate, of an upper lifting element of the lifting apparatus when the first support plate is moved to a lowest position relative to a second support plate, or wheels support plate, of a lower lifting element of the lifting apparatus. According to one embodiment of the invention, the rack may be connected to the slide plate, and the stopper provided in the second support plate. Alternatively, according to another embodiment of the invention, the rack may be connected to the second support plate, and the stopper connected to the slide plate. Alternatively, according to still another embodiment of the invention, the rack may be connected to the slide plate, and the stopper connected to a bottom of the first support plate.

7 Claims, 4 Drawing Sheets

MECHANISM FOR AUTOMATICALLY FIXING A SLIDE PLATE OF A SYSTEM FOR LIFTING A MOTOR VEHICLE FOR REPAIR THEREOF

FIELD OF THE INVENTION

This invention relates to a mechanism for automatically fixing a slide plate of a system for lifting a motor vehicle for repair thereof.

BACKGROUND OF THE INVENTION

In the prior art, as proposed by Japanese Application for Registration of Utility Model No. 61-77355 (published under No. 62-189391), a vehicle lift exists which has a slide plate to adjust the length of a vehicle-body support means to support the bottom of a vehicle body at a sufficient surface area for the weight or size of the particular vehicle. Such a vehicle lift is very convenient since it eliminates the necessity of providing a number of vehicle lifts having vehicle-body support means of different lengths for vehicles with different sizes or weights. However, if the slide plate is slidable at all times, it is natural that the slide plate is displaced when a wheel of a vehicle passes thereon. Therefore, it is necessary that the slide plate be unmovable when a wheel of a vehicle passes thereon. Thus so far, in many cases, the slide plate has been bolted manually before a wheel of a vehicle passes thereon. It produces trouble, since the slide plate must be unfixed for the lifting of a next vehicle if the next vehicle requires the adjustment of the length of the vehicle-body support means.

SUMMARY OF THE INVENTION

Accordingly, it is the object of the invention to provide a mechanism for automatically fixing a slide plate mounted on a vehicle-body support plate of a system for lifting a motor vehicle for repair thereof.

According to the invention, a mechanism for automatically fixing a slide plate mounted on a first support plate, or vehicle-body support plate, of an upper lifting means comprises a rack and a stopper means which are capable of engaging each other to fix the slide plate to the first support plate when the first support plate is moved to a lowest position relative to a second support plate, or wheels support plate, of a lower lifting means.

According to a preferred embodiment of the invention, the rack may be connected to the slide plate, and the stopper means provided in the second support plate.

Alternatively, according to another preferred embodiment of the invention, the rack may be connected to the second support plate, and the stopper means connected to the slide plate.

Alternatively, according to still another preferred embodiment of the invention, the rack may be connected to the slide plate, and the stopper means connected to a bottom of the first support plate.

DETAILED DESCRIPTION OF THE PREFERRED EMBODIMENT

Figure 1:
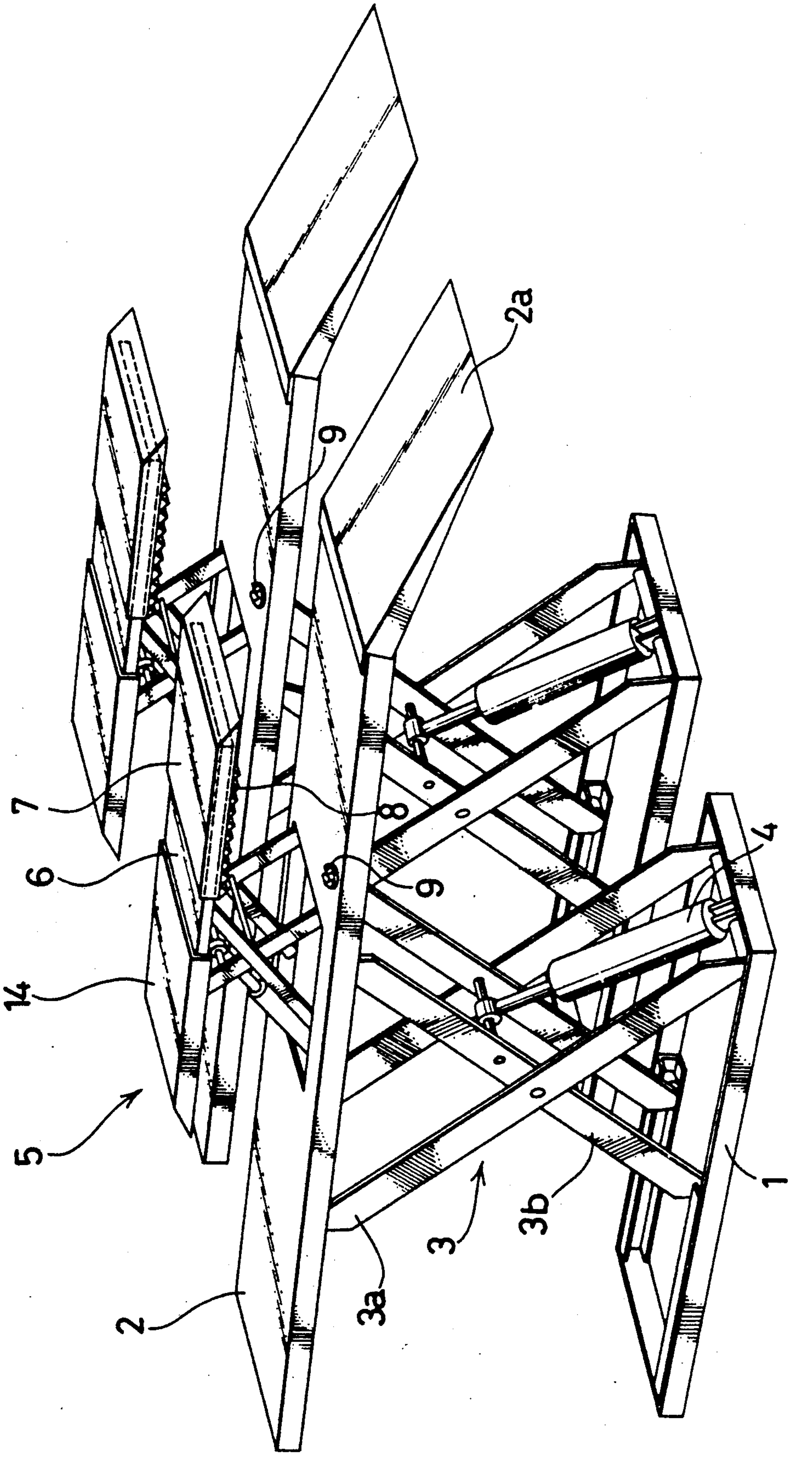
FIG. 1 is a perspective view of a system for lifting a motor vehicle for repair which includes a pair of lifting apparatuses each having a fixing mechanism of the invention.

With reference to the drawing, description will now be made of a system for lifting a motor vehicle for repair which includes mechanisms for temporarily fixing slide plates according to the invention. FIG. 1 depicts the entire lift system. The lift system comprises a pair of juxtaposed lifting apparatuses which are operated synchronously to lift one motor vehicle together. The two lifting apparatuses are identical with each other in both construction and function. Thus only one of them will be described.

The lifting apparatus includes a base frame 1 and a support plate 2. The base frame 1 and the support plate 2 are connected to each other by a pair of parallel vertically-extensible link mechanisms 3. Each link mechanism 3 includes an outer link 3*a* and an inner link 3*b* pivotally connected to each other, at middle portions thereof, to form the alphabetical letter "X". The outer link 3*a* has a lower, or right-hand end pivotally connected to the base frame 1 and an upper, or left-hand end connected to the support plate 2 for sliding movement along a side wall thereof. The inner link 3 has a lower, or left-hand end connected to the base frame 1 for sliding movement along a side wall of the frame 1 and an upper, or right-hand end pivotally connected to the support plate 2. A hydraulic cylinder 4 is located between the two link mechanisms 3. The hydraulic cylinder 4 has a lower end connected to the pivot which mounts the lower ends of the outer links 3*a*. Also, the cylinder 4 has a piston rod with an upper end connected to a pivot which connects the inner links 3*b*. Thus, when the piston rod of the cylinder 4 is extended or retracted, the two link mechanisms 3 are extended or retracted synchronously.

An inclined plate 2*a* is connected to the support plate 2 at one end thereof. When the link mechanisms 3 are in completely retracted positions, the inclined plate 2*a* is in contact with the floor or ground at the free end thereof. And when the link mechanisms 3 are in the completely retracted positions, a motor vehicle to be lifted by the entire lift system is driven from the direction of the inclined plate 2*a* onto the support plate 2 via the inclined plate 2*a*. Thus, the inclined plate 2*a* facilitates the driving of the motor vehicle onto the support plate 2*a*. The support plate 2 support wheels of the motor vehicle.

Figure 4:
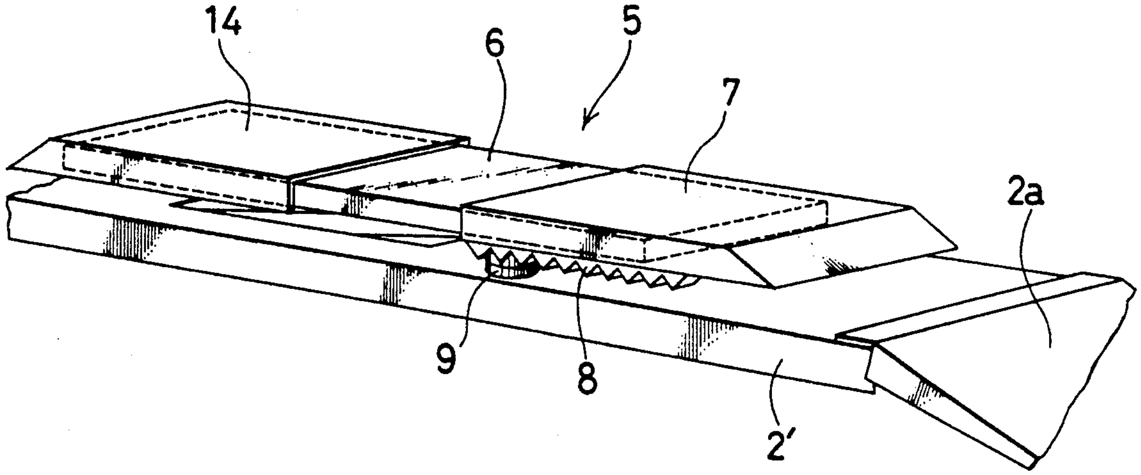
In FIG. 4 a rack and a stopper of the fixing mechanism is in engagement with each other.

The support plate 2 is provided with an opening at a substantially central portion thereof. A vertically-extensible jack 5 is provided in the opening. The jack 5 includes a pair of link mechanisms 3' and a support plate 6 supported thereon. Each link mechanism 3' is similar to the lower, larger link mechanism 3 in both construction and function, except that the link mechanism 3' serves not to support the wheels of a motor vehicle, but to support the bottom of the body thereof. The link mechanisms 3' are extended and retracted synchronously from and into the foregoing opening by a hydraulic cylinder 4'. When the link mechanisms 3' are completely retracted, the jack 5 is almost entirely folded into the opening, expect for the support plate 6 (and members mounted thereon which will hereinafter be described), as shown in FIG. 4.

The support plates 2 and 6 will hereafter be called a "lower support plate" and an "upper support plate", respectively, where appropriate.

Figure 2:
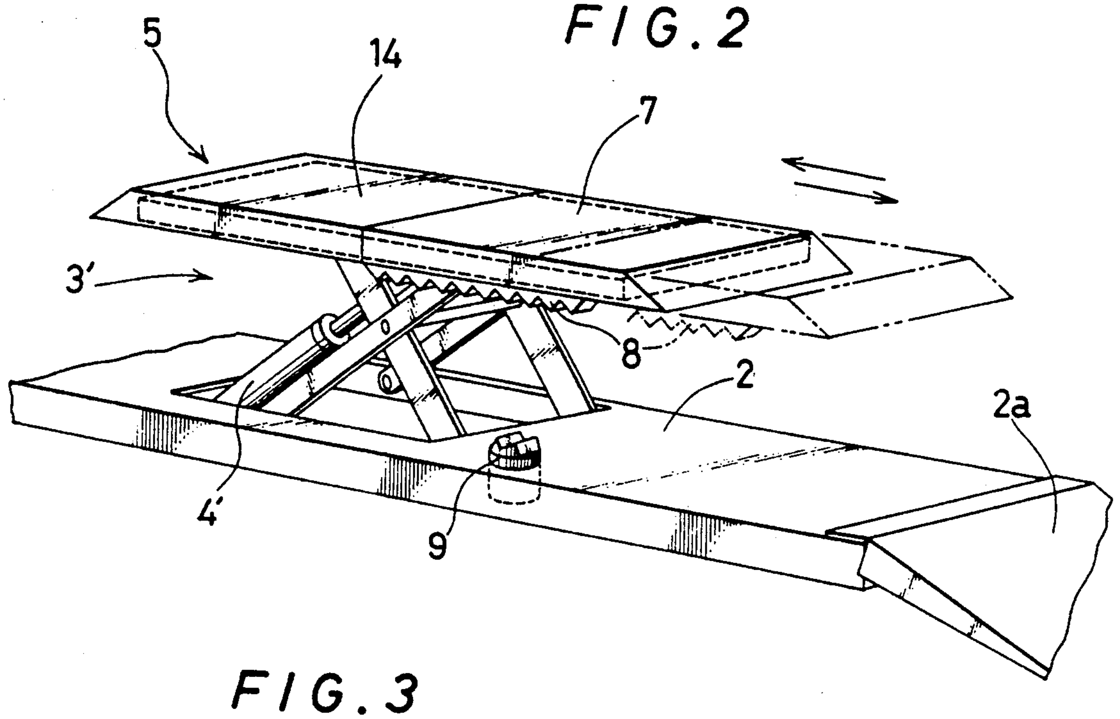
FIG. 2 shows the fixing mechanism of FIG. 1 in detail.

A slide plate 7 is slidably mounted on the support plate 6. The slide plate 7 covers a substantial front half of the support plate 6. The other half of the support plate 6 is covered by a fixed plate 14 which is also mounted on the plate 6. The slide plate 7 and the fixed plate 14 are flush with each other at their tops. In FIG. 2 the slide plate 7 is in contact with the fixed plate 14, but may be slided manually away from and toward the fixed plate 14 as indicated by arrows of FIG. 2. The slide plate 7 may be thus slided to a desired position in order that the jack 5 may support and lift the bottom of the body of the motor vehicle at a sufficient surface area for the weight or size of the particular motor vehicle. Needless to say, the jack 5 of each lifting apparatus supports one of opposed side portions of the bottom of the motor vehicle.

The slide plate 7 covers the substantial front half of the support plate 6 not only with the top, opposed side walls and front inclined surface thereof, but also with elongate portions thereof (not shown) which project inwardly toward each other from bottom portions of the opposed side walls thereof and extend along the opposed side walls thereof.

A rack 8 is secured to the bottom of one of the opposed side walls of the slide plate 7. The rack 8 extends along the length of the support plate 6.

Figure 3:
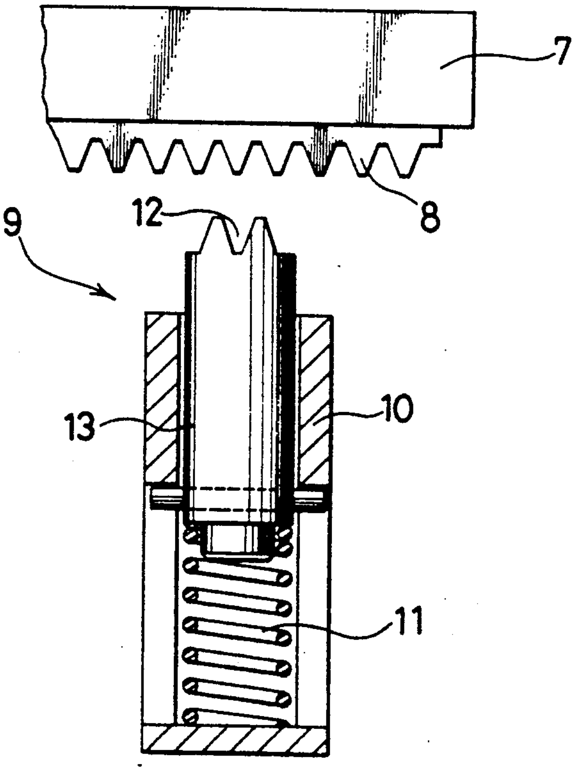
FIG. 3 shows the fixing mechanism in more detail.

A stopper 9 is provided in the lower support plate 2. The stopper 9 is located such that, when the jack 5 is completely retracted, the stopper 9 engages one of the projections of the rack 8 (FIG. 4). The stopper 9 comprises a rod 13 and a coil spring 11. The rod 13 is vertically disposed within a cylindrical guide wall 10 fixed in a small cylindrical opening of the lower support plate 2. As best shown in FIG. 3, the rod 13 has a top projecting upwardly from the guide wall 10. The coil spring 11 is disposed below the rod 13 in the foregoing small opening, and urges the rod 13 upwardly at all times so as to keep the top of the rod 13 projecting upwardly from the guide wall 10. As best shown in FIG. 3, the top of the rod 13 has a recess 12 for receiving one of the projections of the rack 8 to fix the slide plate 7 to the support plate 6 (FIG. 4).

In use, at first the lower link mechanisms 3 and the upper link mechanisms 3′ are all in completely retracted positions. The stopper 9 is in engagement with one of the projections of the rack 8. First, the jack 5 is slightly extended to disengage the projection of the rack 8 from the stopper 9. The slide plate 7 is now slidable. So the slide plate 7 is slided manually to a desired position in order that the jack 5 may lift and support the bottom of the body of a particular motor vehicle at a sufficient surface area for the particular weight or size thereof. Then, the jack 5 is retracted again. The rack 8 thus engages the stopper 9 at a particular projection thereof again (FIG. 4). The slide plate 7 is thus fixed to the support plate 6 with the selected distance from the fixed plate 14. Then, a motor vehicle to be lifted is driven onto the support plate 2 via the inclined plate 2*a*, until the front and rear wheels of the vehicle have been on the support plate 2 with the retracted jack 5 between. When moving past the retracted jack 5, the front wheel of the vehicle urges the slide plate 7 to slide by riding, or passing thereon. However, since the slide plate 7 is now fixed to the support plate 6, the slide plate 7 is not slided, or displaced, by the riding of the front wheel thereon. Thence, the lower link mechanisms 3 are extended to lift the vehicle to a required first height. Subsequently, the jack 5 is extended from the opening of the lower support plate 2 to lift the vehicle to a required second height. That is, the jack 5 is extended therefrom to support and lift the bottom of the body of the vehicle, thereby lifting the wheels thereof out of contact with the lower support plate 2. Thus the slide plate 7 is now disengaged from the stopper 9 and instead is supporting directly the bottom of the body of the vehicle together with the fixed plate 14. From a different point of view, there is now a very large friction between the bottom of the body of the vehicle and the slide plate 7. Therefore, although the slide plate 7 is now no longer fixed by the stopper 9, the friction certainly prevents the slide plate 7 from being slided. Thus the vehicle is safely lifted away from the lower support plate 2 to the second height.

At the second height, the vehicle now having its wheels lifted away from the lower support plate 2 is ready for a necessary repair work, such as the replacement of the wheels.

When the vehicle has been repaired, the jack 5 is retracted to place the wheels of the vehicle down on the lower support plate 2 again. The rack 8 is now in engagement with the stopper 9 again. Then, the lower link mechanisms 3 are retracted to lower the vehicle. Subsequently, the vehicle is backed to discharge it from on the lift system. Thus, the front wheel rides on the slide plate 7 as well as the fixed plate 14 again, as it has done so when driven onto the system. However, since the rack 8 is in engagement with the stopper 9, the slide plate 7 is not slided, or displaced, by the riding of the front wheel thereon.

Thus, the rack 8 and the stopper 9 constitute a mechanism for temporarily fixing the slide plate 7 which embodies the invention in a preferred form.

Figure 5:
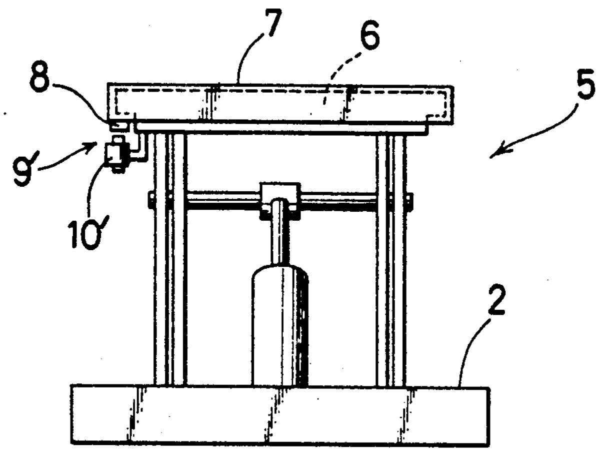
FIGS. 5 and 6 show another fixing mechanism of the invention.
Figure 6:
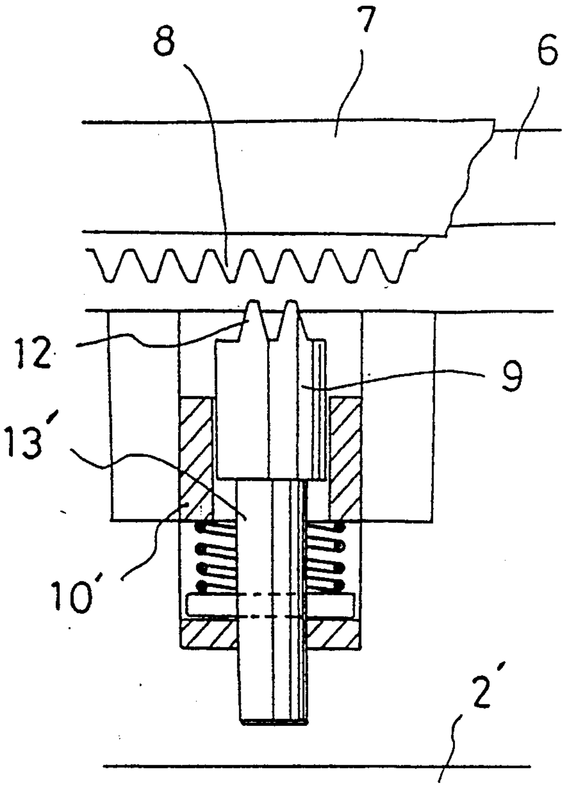

A mechanism for temporarily fixing the slide plate 7 which embodies the invention in another preferred form is illustrated in FIGS. 5 and 6. That is, another fixing mechanism of the invention is obtained by omitting the stopper 9 entirely from the lower support plate 2 and instead connecting a stopper 9′ to the bottom of the upper support plate 6 as better shown in FIG. 5. In this embodiment, however, the rack 8 is not omitted nor modified in any way. In FIG. 5 a cylindrical guide wall 10′ is seen to be connected to the bottom of the upper support plate 6 by means of an L-shaped member. A rod 13′ is disposed within the guide wall 10′ for vertical movement. The rod 13′ has a recess 12′ at its top. Like the recess 12 of the first embodiment, the recess 12′ receives one of the projections of the rack 8 to fix the slide plate 7. The top and the bottom of the rod 13′ project from the top and the bottom of the guide wall 10′, respectively. According to this embodiment, when the upper link mechanisms 3′ are retracted, the rod 13′ contacts the upper surface of the lower support plate 2 at its bottom and, hence, is moved upwardly to engage one of the projections of the rack 8. Thus the stopper 9′ fixes the slide plate 7 to the support plate 6 in the same manner as the preceding stopper 9. However, unlike the preceding stopper 9, the stopper 9′ may not disengage readily from the rack 8 when the link mechanisms 3′ are extended, since the stopper 9′ is moved upwardly together with the support plate 6. But such a possibility may be eliminated if a spring is provided in the guide wall 10′ to urge the rod 13′ downwardly at all times. Such an arrangement makes it possible for the rod 13′ to move downwardly out of the engagement with the rack 8 at the same time that the upper support plate 6 is moved upwardly away from the lower support plate 2.

Figure 7:
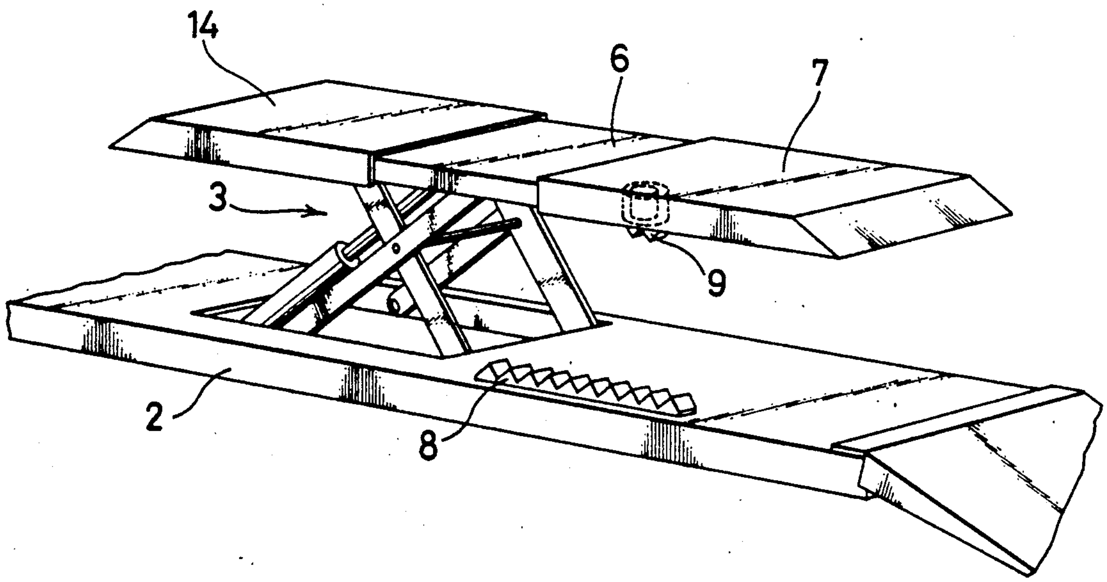
FIG. 7 shows a still another fixing mechanism of the invention.

Also, as shown in FIG. 7, if desired, the slide plate 7 may be fixed to the support plate 6 with the very reverse of the first embodiment. That is, a stopper 9 may be connected to the inside of one of the opposed side walls of the slide plate 7, and a rack 8 may be connected to the lower support plate 2 such that the rack 8 may engage the stopper 9 with any one of the projections thereof.

Moreover, if desired, an additional fixing mechanism may be provided on the other side of the support plate 2.

What is claimed is:

1. A mechanism for automatically fixing a horizontally moveable slide plate for a lifting apparatus of a lift system which includes a pair of upper and lower lifting means, said slide plate being horizontally slidably mounted on a horizontally disposed first support plate, or vehicle-body support plate, of the upper lifting means, said mechanism comprising a rack and a stopper means adapted to engage each other to fix the slide plate against horizontal displacement relative to the first support plate when the first support plate is moved to a lowest position relative to a second support plate, or wheels support plate, of the lower lifting means.

2. A mechanism in accordance with claim 1 wherein the rack is connected to the slide plate, and the stopper means is provided in the second support plate.

3. A mechanism for automatically fixing a slide plate for a lifting apparatus of a lift system which includes a pair of upper and lower lifting means, said slide plate being slidably mounted on a first support plate, or vehicle-body support plate of the upper lifting means, said mechanism comprising a rack and a stopper means, wherein said rack is connected to the slide plate, and said stopper means is provided in a second support plate, or wheels support plate, of the lower lifting means, said rack and stopper means being adapted to engage each other to fix the slide plate tot he first support plate when the first support plate is moved to a lowest position relative to the second support plate.

wherein the stopper means has a recessed top projecting from the second support plate to receive any one of the projections of the rack.

4. A mechanism for automatically fixing a slide plate for a lifting apparatus of a lift system which includes a pair of upper and lower lifting means, said slide plate being slidably mounted on a first support plate, or vehicle-body support plate of the upper lifting means, said mechanism comprising a rack and a stopper means, said rack and stopper means adapted to engage each other to fix the slide plate to the first support plate when the first support plate is moved to a lowest position relative to a second support plate, or wheels support plate, of the lower lifting means.

wherein the rack is connected tot he second support plate, and the stopper means is connected to the slide plate.

5. A mechanism in accordance with claim 4 wherein the stopper means has a recessed bottom projecting from a bottom of the slide plate to receive any one of projections of the rack.

6. A mechanism for automatically fixing a slide plate for a lifting apparatus of a lift system which includes a pair of upper and lower lifting means, said slide plate being slidably mounted on a first support plate of the upper lifting means, said mechanism comprising a rack and a stopper means which are adapted to engage each other to fix the slide plate to the first support plate when the first support plate is moved to a lowest position relative to a second support plate of the lower lifting means.

wherein said rack is connected to the slide plate and said stopper means is connected to the bottom of the first support plate, and wherein said stopper means comprises a rod which is vertically movably disposed in a guide means suspended from the bottom of the first support plate, said rod having a recessed top projecting from a top of said guide means and a bottom projecting from a bottom of said guide means and said rod coming into contact with the second support plate at the bottom thereof to rise into engagement with one of the projections of the rack at the recessed top thereof when the first support plate is moved to lowest position.

7. A mechanism in accordance with claim 6 wherein a spring is provided in the guide means for urging the rod downwardly so as to disengage the rod from the rack at the same time that the rod is moved out of contact with the second support plate.

* * * * *

UNITED STATES PATENT AND TRADEMARK OFFICE

CERTIFICATE OF CORRECTION

PATENT NO. : 5,031,726

DATED : July 16, 1991

INVENTOR(S) : Koji Wakamiya

It is certified that error appears in the above-identified patent and that said Letters Patent is hereby corrected as shown below:

Column 5, line 45, after "plate" please delete "." and insert --,--.

Column 6, line 11, after "means" please delete "." and insert --,--.

Column 6, line 12, please delete "tot he" and insert --to the--.

Signed and Sealed this

Twenty-second Day of December, 1992

*Attest:*

DOUGLAS B. COMER

*Attesting Officer*

*Acting Commissioner of Patents and Trademarks*